March 22, 1960

C. J. MILLER 2,929,924

RADIATION SUPPRESSION CIRCUIT

Filed Feb. 21, 1955

WITNESSES

Edwin E. Bassler

T. H. Murray

INVENTOR

Coleman J. Miller

BY

F. E. Browder

ATTORNEY 2,929,924

RADIATION SUPPRESSION CIRCUIT

Coleman J. Miller, Rock Hill Beach, Md., assignor to Westinghouse Electric Corporation, East Pittsburgh, Pa., a corporation of Pennsylvania Application February 21, 1955, Serial No. 489,609

4 Claims. (Cl. 250—17)

Figure 1:
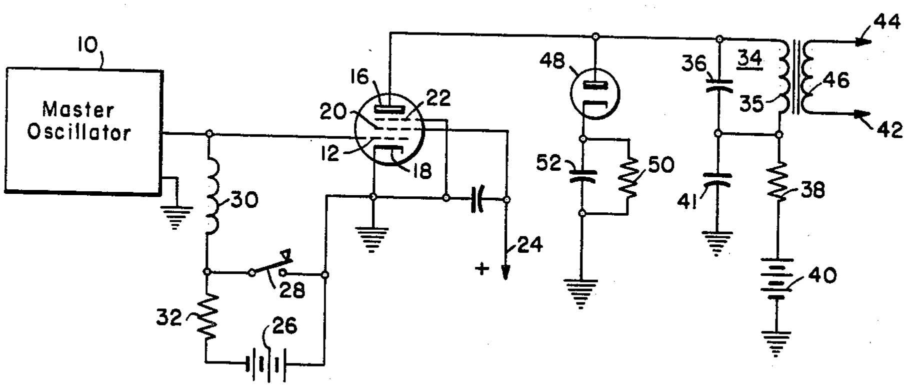

This invention relates to keyed communication transmitters, and more particularly to apparatus in a keyed communication transmitter for suppressing or eliminating radio frequency radiation during key-up conditions.

In high frequency transmitters employing a plurality of cascade-connected amplifiers, it is often desirable to keep the transmitter oscillator running when the key is raised, using the key, in effect, to turn amplifier stages on and off. If the oscillator were turned on and off in accordance with the "down" and "up" position of the telegraph key, its frequency stability would be adversely affected. In most cases, therefore, the oscillator is kept running while the subsequent stages of amplification are periodically blocked (i.e., provided with a holding bias) to effect keying.

It has been found that although the amplification stages in a conventional keyed transmitter are blocked by a holding bias during the "up" position of the telegraph key, a small amount of the output energy of the oscillator will be delivered to the antenna through the grid-plate capacitances of the amplifier tubes, even though these tubes are then blocked for D.C. plate current. That is to say, the interelectrode capacitances of the amplifier tubes always provide a complete circuit for any high frequency oscillations in the network, regardless of whether or not the tubes are in condition for amplification of the oscillations. This condition is, of course, very undesirable, especially in cases where a transmitter and receiver are operated at the same frequency.

It is a primary object of my invention to provide means in a keyed transmitter for reducing key-up radiation without materially affecting key-down operation.

Another object of my invention lies in the provision of radiation suppression apparatus which can be used equally well in either vacuum tube or transistor amplifiers.

A still further object of my invention is to provide radiation suppression apparatus which uses a minimum number of parts and which is easily adaptable to a conventional amplifier without changing the basic amplifier configuration.

In one embodiment of my invention, hereinafter described, I provide a shunt path for a class C amplifying device including a diode having its anode connected to one of the output terminals of the amplifying device. The cathode of said diode is connected through the parallel combination of a resistor and a capacitor to the other output terminal of the amplifying device. With this configuration the power supply for the amplifying device will cause a direct current to flow through the diode and the resistor in the shunt path. This direct current is just large enough to bias the diode in the forward direction, thereby allowing the diode to pass low amplitude signals which leak through the amplifying device during key-up conditions. The capacitor which is in parallel with the resistor presents a low impedance to the signals; and, therefore, the shunt path bypasses signals to ground and prevents them from entering the output circuit of the amplifier. Under key-down conditions, the output of the amplifying device will exceed the direct current through the diode and resistor, thereby causing the diode to rectify and build up a D.C. voltage across the resistor. Under these conditions, the input impedance to the shunt path will be high compared to that of the output circuit for the amplifying device so that only a small fraction of the output of the amplifying device will be shunted to ground during key-down conditions. The invention thus prevents radiation during key-up conditions without affecting the normal key-down action of the transmitter.

Figure 2:
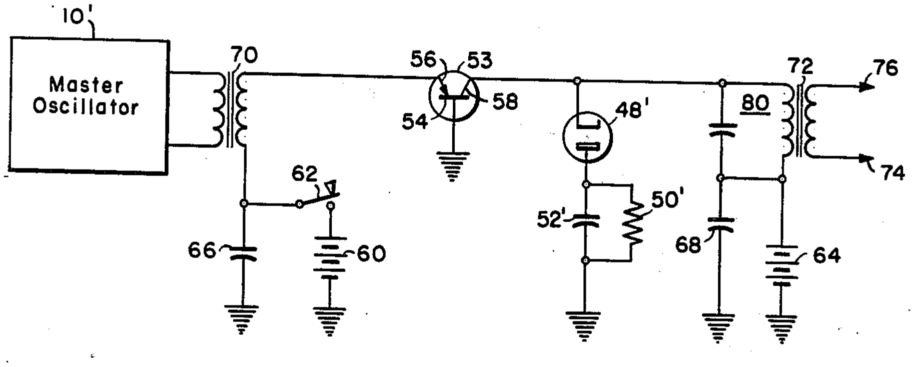

Further objects and features of the invention will become apparent from the following detailed description taken in connection with the accompanying drawings which form a part of this specification and in which:

Figure 1 is a schematic illustration of one embodiment of my invention using a vacuum tube as an amplifying device; and Fig. 2 is a schematic diagram of another embodiment of my invention using a transistor as an amplifying device.

Referring to Fig. 1, the circuit shown includes a master oscillator 10, the output of which is applied to the control grid 12 of an amplifying vacuum tube 16. Tube 16 is operated class C, having its cathode 18 connected directly to ground. However, class A or class B operation may be used if desired. The suppressor grid 22 of tube 16 is connected to cathode 18 and screen grid 20 is connected to a source of positive voltage, not shown, at terminal 24.

In the present embodiment of the invention, grid circuit keying is employed. The keying circuit includes a source of voltage 26 which normally applies a negative voltage to grid 12 sufficient to cut off tube 16 and prevent current flow. When key 28 is closed, grid 12 assumes the same voltage level as cathode 18 to thereby condition tube 16 to amplify the positive half of an input signal applied to grid 12. Choke coil 30 prevents the radio frequency energy applied to control grid 12 from passing through voltage source 26 while resistor 32 serves to limit the drain on voltage source 26 during key-down conditions.

The anode circuit of tube 16 includes a parallel resonant tank circuit 34 comprising inductance 35 and capacitance 36. Resistor 38 and a source of anode voltage 40 complete the anode circuit. Radio frequency energy is prevented from passing through voltage source 40 by means of bypass condenser 41. The output of the amplifier is transferred to output terminals 42 and 44 by a winding 46 which is inductively coupled to inductance 35. These terminals may be connected to succeeding amplification stages which are, in turn, connected to an antenna tuning circuit.

Diode 48, resistor 50 and capacitor 52 comprise the means for automatically suppressing radio frequency radiations during key-up conditions. Resistor 50 is chosen so that the direct current from source 40 flowing through diode 48 and resistor 50 under key-up conditions is appreciably larger than the RF current expected from tube 16 due to unavoidable coupling from the input to the output circuit of the amplifier. This current should be high enough to reduce the diode resistance to a small value, but should be small compared to the RF current flowing in the plate circuit under key-down conditions. Diode 48 is in this way sufficiently biased in the forward direction under key-up conditions to pass the low amplitude radiations which leak through the grid-plate capacitance of tube 16. Capacitor 52 will present a low impedance to signals having the frequency of the output of master oscillator 10. Under key-up conditions, therefore, any radio frequency energy which leaks through amplifier 16 is shunted to ground through the low impedance path presented by diode 48 and capacitor 52, thereby preventing any appreciable RF voltage from being applied to the tank circuit 34.

Under key-down conditions, the RF current through tube 16 will exceed the direct current through the diode 48 and resistor 50, thereby causing the diode to rectify periodically. That is, the diode will be cut off on the positive half of the input voltage cycle when amplifier 16 conducts and will conduct on the negative half cycle when amplifier 16 is cut off. The rectifying action of diode 48 builds up a direct current voltage across resistor 50 which approaches the peak RF voltage on the plate of tube 16. Under these conditions the input impedance to the diode circuit is greater than one-half of the value of resistor 50. This impedance will be high compared to the impedance of tank circuit 34 so that only a small fraction of the RF power will be wasted in the diode circuit. It should be noted that when resistor 50 and capacitor 52 are chosen in the manner described, their RC time constant may be large enough that a full reduction in key-up radiation may not be obtained between successive peak pulses in a single train of transmitted pulses. This is of no practical importance since key-up radiation suppression is required in practice only between successive trains of pulses.

The radiation suppression circuit described above can be used equally well on transistor amplifiers, requiring only that the diode be inverted if the suppression circuit is connected to a transistor collector circuit having a negative D.C. potential. Such a circuit is shown in Fig. 2. Referring to Fig. 2, the amplifier shown includes a grounded base point contact transistor 53. The transistor is of the usual type comprising a base 54 of n-type germanium upon which the emitter 56 and collector 58 bear. During manufacture the collector is "electrically" formed in such a manner that the n-type germanium in a small surrounding region is converted to p-type germanium. Emitter 56 is adapted to be biased positive with respect to base 34 by a first source of direct current voltage 60. This voltage may be controlled by key 62. The collector 58 is biased negative by a second source of direct current voltage 64. Current in the conventional sense flows from the emitter 56 to the base 54 and from the base to collector 58. In order to prevent the alternating component of the current passing through the transistor from passing through voltage sources 60 and 64, a pair of bypass condensers 66 and 68 are provided. Input signals from master oscillator 10′ are applied between the emitter and base of transistor 53 by means of coupling transformer 70; and likewise, the output of the amplifier is transferred by transformer 72 to output terminals 74 and 76. The primary winding of transformer 72, together with capacitor 78, forms a parallel resonant tank circuit 80. In the absence of a positive bias voltage on emitter 56 during key-up conditions, the amplification through transistor 52 will be extremely small. However, small amplitude radiations will leak through the transistor as they did in the case of amplifying vacuum tube 16. It should be noted that current through the tank circuit is reversed with respect to the current flowing through the tank circuit of the vacuum tube amplifier. Therefore, diode 48′ must now be reversed for the suppression circuit to function properly during key-up conditions. Diode 48′ will be biased in the forward direction during key-up conditions in an amount sufficient to pass small amplitude signals which leak through transistor 53. However, when amplifier 53 begins to conduct after key 62 is closed, diode 48′ will rectify so that the input impedance of the suppression circuit of diode 48′, resistor 50′ and capacitor 52′ is greater than the input impedance of the tank circuit 80.

It can be seen, therefore, that the present invention provides a means for effectively suppressing key-up radiation without materially affecting key-down operation. Although the invention has been described in connection with certain specific embodiments, it will be apparent to those skilled in the art that various changes in form and arrangement of parts can be made to suit requirements without departing from the spirit and scope of the invention.

I claim as my invention:

1. In a keyed communication transmitter, a class C operated amplifying device having an electron emitter electrode, an electron collector electrode and a control electrode, a unidirectional current device having an electron emitter electrode and an electron collector electrode, means connecting the collector electrode of said unidirectional current device to the collector electrode of said amplifying device, the parallel combination of a resistor and a capacitor connecting the emitter electrode of said unidirectional current device with the emitter electrode of said amplifying device, said capacitor being characterized by a low impedance at the frequency of input signals applied to the control electrode of said amplifying device, an output circuit for said amplifying device, a resonant tank circuit and a source of voltage included in said output circuit, the values of said resistor and voltage source connected across said unidirectional current device such as to normally bias said unidirectional current device in the forward direction when the amplifying device is cut off whereby the unidirectional current device and capacitor in series will present a lower effective impedance than said tank circuit to signals which leak through the amplifying device, said bias being reversed periodically when said amplifying device conducts to thereby cause said unidirectional current device to rectify and build up a direct current voltage across said resistor, the magnitude of the voltage built up across said resistor during conduction being such that the effective impedance of the current path including said unidirectional current device and capacitor in series is greater than that of said tank circuit.

2. In a keyed communication transmitter, an amplifying device having an electron emitter electrode, an electron collector electrode and a control electrode, a unidirectional current device and a resistor connected in series between the emitter and collector of said amplifying device, a capacitor connected in parallel with said resistor, said capacitor being characterized by a low impedance at the frequency of input signals applied to the control electrode of the amplifying device, a source of driving potential for said amplifying device, the values of said source of driving potential and said resistor being such as to normally bias said unidirectional current device in the forward direction when the amplifying device is cut off whereby the unidirectional current device and capacitor in series will short circuit signals which leak through the amplifying device, said bias being reversed when the amplitude of an input signal reaches a predetermined level to thereby prevent the passage of signals through said unidirectional current device when the amplifying device conducts, and a parallel resonant tank circuit for said amplifying device connected in parallel with the series combination of said resistor and unidirectional current device.

3. In a keyed communication transmitter, an amplifying device having a pair of output terminals for amplified signals, a rectifier having an anode and a cathode, a direct connection between the anode of said rectifier and one of said output terminals, a device connected between said other output terminal and the cathode of said rectifier, said connecting device being characterized by a high impedance to direct currents and a low impedance to signals having the frequency of input signals applied to said amplifying device, a tank circuit connected to said one output terminal of said amplifying device, a source of direct current potential, and means including said potential source for normally biasing said rectifier in the forward direction when the amplifying device is cut off whereby the rectifier will shunt signals which leak through said amplifying device and prevent them from passing through said tank circuit, said bias being reversed periodically when said amplifying device amplifies an input signal applied thereto to prevent the passage of signals through said rectifier.

4. The combination claimed in claim 3 wherein the amplifying device is operated class C.

References Cited in the file of this patent

UNITED STATES PATENTS

| | | |
|---|---|---|
| 1,849,865 | Davis | Mar. 15, 1932 |
| 1,942,457 | Summers | Jan. 9, 1934 |
| 2,086,899 | Currier et al. | July 13, 1937 |
| 2,273,934 | Campbell | Feb. 24, 1942 |
| 2,325,366 | Brown | July 27, 1943 |
| 2,338,556 | Weldon | Jan. 4, 1944 |
| 2,341,937 | Maynard | Feb. 15, 1944 |
| 2,353,018 | Duke | July 4, 1944 |
| 2,402,598 | Charchian | June 25, 1946 |
| 2,489,268 | Chatterjea et al. | Nov. 29, 1949 |
| 2,504,699 | Kluender | Apr. 18, 1950 |